(12) United States Patent
Saito

(10) Patent No.: US 9,295,989 B2
(45) Date of Patent: Mar. 29, 2016

(54) CHANNEL DEVICE

(71) Applicant: CANON KABUSHIKI KAISHA, Tokyo (JP)

(72) Inventor: Tomohiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/493,653

(22) Filed: Sep. 23, 2014

(65) Prior Publication Data

US 2015/0086446 A1    Mar. 26, 2015

(30) Foreign Application Priority Data

Sep. 26, 2013   (JP) .................................. 2013-199709

(51) Int. Cl.
*G01N 15/06*   (2006.01)
*G01N 33/00*   (2006.01)
*G01N 33/48*   (2006.01)
*B01L 3/00*    (2006.01)
*C09J 5/00*    (2006.01)

(52) U.S. Cl.
CPC ............. *B01L 3/502707* (2013.01); *C09J 5/00* (2013.01); *B01L 2200/025* (2013.01); *B01L 2200/0689* (2013.01); *B01L 2300/0816* (2013.01); *B01L 2300/0887* (2013.01); *Y10T 156/10* (2015.01)

(58) Field of Classification Search
CPC ........ G01N 15/06; G01N 33/00; G01N 33/48
USPC ............................. 422/502, 503, 504; 436/43
See application file for complete search history.

(56) References Cited

U.S. PATENT DOCUMENTS

| | | | | |
|---|---|---|---|---|
| 5,498,392 | A | * | 3/1996 | Wilding et al. ............... 422/68.1 |
| 5,500,071 | A | * | 3/1996 | Kaltenbach et al. ........ 156/272.8 |
| 5,585,069 | A | * | 12/1996 | Zanzucchi et al. ............ 422/505 |
| 6,123,798 | A | * | 9/2000 | Gandhi et al. ................. 156/292 |

FOREIGN PATENT DOCUMENTS

| | | |
|---|---|---|
| JP | 2007-021790 A | 2/2007 |
| JP | 2008-175795 A | 7/2008 |
| JP | 4348454 B2 | 10/2009 |

* cited by examiner

*Primary Examiner* — Brian J Sines
(74) *Attorney, Agent, or Firm* — Canon USA Inc. IP Division

(57) ABSTRACT

A channel device includes a first substrate having a groove portion for forming a channel, and a second substrate having a protruding portion that covers the groove portion, the first substrate and the second substrate being bonded together with an adhesive. The protruding portion of the second substrate extends along the extending direction of the groove portion of the first substrate, and mutually corresponding parts of the protruding portion of the second substrate and the groove portion of the first substrate are in direct and linear contact with each other without an adhesive therebetween, and the channel is thereby formed.

10 Claims, 2 Drawing Sheets

CHANNEL DEVICE

BACKGROUND

1. Field

The present disclosure relates to a channel device such as a microchannel device capable of thermal analysis or the like, and a method for manufacturing the same.

2. Description of the Related Art

In order to obtain the course of biochemical reaction and the results of chemical analysis, various devices and sensors have been developed. As one of such devices, microdevices that have, in a substrate, a fine structure such as a channel having a predetermined shape or a microchannel have been proposed. These microdevices are downsized by using a semiconductor manufacturing method or the like, and all steps of an analysis process to obtain desired information can be performed on a microdevice. Such a device is called micro total analysis system (μ-TAS) or lab-on-a-chip. A structure having, in a substrate, a fine structure such as a microchannel is called microchannel device. Each part of a microchannel device has a size exemplified in embodiments and examples described later.

In the case of these microdevices, as compared to conventional desktop-sized analysis devices, the amount of fluid contained in the device is reduced, and reduction in the amount of reagent needed, and reduction in reaction time due to reduction in the amount of analyte are expected. For example, in the case of a microdevice such that a heater (resistor element) is disposed in a microchannel, and fluid passing through the microchannel is heated, the fluid capacity is small, and therefore the microdevice has good temperature following capability with respect to the heater, and the temperature can be rapidly increased and decreased. By using such a microdevice, for example, PCR (polymerase-chain-reaction) of DNA can be performed in a shorter time.

Many of such microchannel devices having a microchannel employ a glass substrate as a base. In general, glass substrates are bonded together in order to form a microchannel. For example, there is a bonding method such as a direct bonding method including forming a groove to form a microchannel in a glass substrate by etching, preparing a substrate serving as a cover on the opposite side, and applying pressure to the two substrates in a bonded state (see Japanese Patent No. 4348454). Such a bonding method does not affect the microchannel, but an accurate plane is required for bonding. In order to bond a large number of devices at the same time in view of mass production, the pressing force needs to be very large, a large apparatus is needed, and therefore manufacturing cost increases. So, a more inexpensive bonding method has been desired.

In the case of a microchannel device made of plastic and resin, bonding by heating, ultrasonic waves, laser light, organic adhesive, and the like can be used in the bonding step. However, in the case of press-bonding by heating, the resin substrate itself forming the device is deformed by heat, the shape of the microchannel changes, and it is not easy to reproduce the accurate shape of the microchannel. If the shape of the microchannel changes, the volume of solution caused to flow through the microchannel changes. Therefore, when a controlling method is used in which a fixed amount of fluid is caused to flow through a microchannel, and the position of the fluid is detected by fluorescence or the like of the fluid, the change in the shape of the microchannel is a problem. In the case of bonding by ultrasonic waves, bonding is possible when the size of the device is several millimeters square. However, when the size of the device is several tens of millimeters square or larger, the intensity distribution of ultrasonic waves is large, nonuniformity in bonding strength occurs, and it is not easy to obtain reproducibility and reliability of bonding. In the case of bonding by laser light, resin is required to have transmission for light of a wavelength of laser light. Depending on circumstances, laser light may be absorbed in a place other than the bonded surface, heat may be produced, and the place may be deformed. A laser light oscillating device is expensive, and a high cost is required for manufacturing.

So, a bonding method by organic adhesive is devised. A groove to form a microchannel is formed in a glass or resin substrate, and this substrate and a substrate serving as a cover are bonded with adhesive. In the case of bonding by adhesive, if the thickness of the adhesive layer is small, voids may be formed on the bonded surface owing to the minute unevenness of the substrate. If voids are formed, the bonding area decreases, therefore bonding force decreases, and separation is caused. If voids are formed close to microchannels, the microchannels may be connected by the voids, and solutions may be mixed. If the thickness of the adhesive layer is large, during bonding, surplus adhesive may fall into the groove forming the microchannel, and the microchannel may be filled with adhesive. If a substrate forming a microchannel and a substrate serving as a cover are bonded only with adhesive, owing to the change in thickness of the adhesive layer, the height of the cross-sectional shape of the microchannel may change along the extending direction of the channel.

There is a method in which, when bonding with adhesive, a soft film is used as a substrate serving as a cover to avoid the influence of minute unevenness, as in a method described in Japanese Patent Laid-Open No. 2008-175795. However, when a film is used, the dimension and shape of the microchannel may vary owing to the flexure or the like of the film. There also is a method in which a bank is provided around a microchannel so that adhesive does not flow into the microchannel, as in a method described in Japanese Patent Laid-Open No. 2007-21790. However, in a configuration in which a bank is provided around a microchannel, when a plurality of microchannels are arranged, it is difficult to reduce the intervals between the microchannels to close up the microchannels. It may be thereby made difficult to increase the density of microchannels to downsize the device. Bonding the bank by a method other than the method for bonding the substrates may complicate the manufacturing process and may increase the manufacturing cost.

SUMMARY

The present disclosure provides a channel device or the like such that, in bonding using adhesive, despite an amount of adhesive sufficient to bond uniformly without forming voids, adhesive is prevented from flowing into and clogging a channel, and the cross-sectional shape of the channel after bonding can be retained as designed.

In an aspect disclosed herein, a channel device includes a first substrate having a groove portion for forming a channel, and a second substrate having a protruding portion that covers the groove portion, the first substrate and the second substrate being bonded together with an adhesive. The protruding portion of the second substrate extends along a direction corresponding to an extending direction of the groove portion of the first substrate, mutually corresponding parts of the protruding portion of the second substrate and the groove portion of the first substrate are in direct and linear contact with each other without an adhesive therebetween, and the channel is thereby formed. In another aspect of the present disclosure, a method for manufacturing a channel device including a first substrate having a groove portion for forming a channel and a second substrate having a protruding portion extending along a direction corresponding to an extending direction of the groove portion, the first substrate and the second substrate being bonded together with an adhesive, is provided. The method includes the steps of applying adhesive to a predetermined part of at least one of the first substrate and the second substrate, bonding the first substrate and the second substrate such that the groove portion of the first substrate and the protruding portion of the second substrate are aligned with each other, and applying pressure to at least one of the first substrate and the second substrate after the bonding so that mutually corresponding parts of the protruding portion of the second substrate and the groove portion of the first substrate are brought into direct and linear contact with each other without adhesive therebetween.

According to the present disclosure, if a sufficient amount of adhesive is used for making a channel device having a channel by bonding so that voids in contact with the channel are not formed, adhesive does not clog the channel, and after bonding, the channel has a predetermined cross-sectional shape regardless of the thickness of the adhesive layer. That is, it is possible to, in bonding using adhesive, prevent adhesive from flowing into and clogging the channel while suppressing formation of voids on the bonded surface, and to keep the cross-sectional shape of the channel after bonding constant or as designed.

Further features of the present disclosure will become apparent from the following description of exemplary embodiments with reference to the attached drawings.

DESCRIPTION OF THE EMBODIMENTS

In the present disclosure, mutually corresponding parts of a groove portion of a first substrate and a protruding portion of a second substrate extending parallel to each other when bonded together are in contact with each other without adhesive therebetween, linearly, and directly, and a channel is thereby formed. The substrates typically have a flat plate shape, but may have a curved plate shape having undulation. The channel typically extends linearly, but may extend in a curve and may have branches. The cross-sectional shape of the channel is typically constant along the extending direction of the channel, but may change according to a predetermined design. If the cross-sectional shapes of the groove portion and the protruding portion are constant in the extending direction, the cross-sectional shape of the channel can also be constant in the extending direction. Thus, a fitting structure in which the height of the cross-sectional shape of the channel is constant or predetermined can be achieved. The cross-sectional shape of the groove portion may be a circular shape or the like such that the groove bottom portion and both side wall portions are connected continuously and smoothly, or a shape such that the groove bottom portion and side wall portions are connected with corners having a given angle therebetween. The cross-sectional shape of the protruding portion may be a circular shape or the like such that the top portion and both side wall portions are connected continuously and smoothly, or a shape such that the top portion and side wall portions are connected with corners having a given angle therebetween. The first substrate, the groove portion, the second substrate, and the protruding portion typically have sizes suitable for forming a microchannel device. These are designed as needed. In short, the spirit of the present disclosure is that, when both substrates are bonded together, the groove portion and the protruding portion are in contact with each other without adhesive therebetween, linearly, and directly, and a laterally-sealed channel can be formed.

Embodiments of the present disclosure will now be described. The present disclosure achieves a channel device, such as a microchannel device, in which a channel such as a minute microchannel is formed by bonding substrates with adhesive, the channel is prevented from being clogged by adhesive, and the cross-sectional shape of the channel is constant or predetermined. A microchannel device is a device having a microchannel. A microchannel is a minute channel formed by covering a groove through which a liquid substance such as a solution containing water and an organic substance is caused to flow. A microchannel can have a width of 1000 μm or less and a depth of 500 μm or less, and the flow of a solution in the microchannel can be not a turbulence but a laminar flow.

Figure 1:
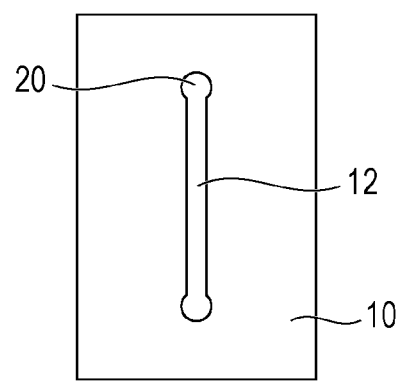
FIG. 1 is a diagram showing an example of a channel device.
Figure 2:
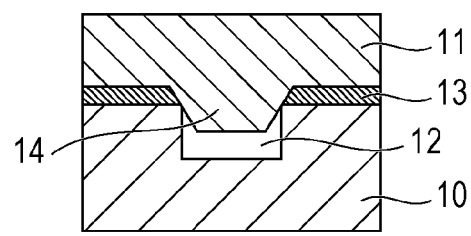
FIG. 2 is a schematic sectional view showing an example of a channel of a channel device.

FIG. 1 is a schematic view showing the sectional shape in the width direction of a microchannel as a subject. As shown in FIG. 1, the microchannel device has a groove portion 12 forming a microchannel and disposed in a first substrate 10, and openings 20 connecting the outside and the microchannel and formed through the first substrate 10. FIG. 2 shows a cross-sectional view of the microchannel shown in FIG. 1. The channel device is composed of the first substrate 10 including the groove portion 12, and the second substrate 11 including the protruding portion 14. Adhesive 13 is disposed in a region outside the channel and between the first and second substrates 10 and 11. Adhesive 13 surrounds the whole microchannel and both substrates are bonded together so that a fluid passing through the channel formed by the groove portion 12 and the protruding portion 14 does not leak in the lateral direction.

Next, the configuration and component members of the microchannel device will be described. The material for the first and second substrates 10 and 11 is not particularly limited, but can be selected from glass, plastic, metal, and inorganic compound. Glasses include silica glass, alkali glass, and alkali-free glass. Plastics include acrylic resin, polyethylene, polypropylene, polyvinyl chloride, polystyrene, and nylon. One type of plastic may be used, and if necessary, a plurality of types of plastics can be used according to the situation. Metals include aluminum, nickel, iron, copper, other metals, and various alloys such as stainless steel and brass. Inorganic compounds include metal oxides such as alumina, zirconia, and silica, mixtures thereof, and ceramic such as boron nitride.

Although the method for manufacturing the substrates used in this embodiment is not particularly limited, etching, machining, and metal molding can be used to form a fine microchannel. In the case of glass, metal, and inorganic compound substrates, a microchannel is generally formed by etching because high accuracy can be achieved. In the case of plastic substrates, injection molding using metal molds can be used because accuracy and mass productivity can be secured.

The protruding portion 14 of the second substrate 11 has a shape along a direction corresponding to the extending direction of the groove portion 12 for forming the microchannel, and is disposed opposite the first substrate 10. Although the method for molding the protruding portion 14 is not particularly limited, injection molding using metal molds can be used in terms of alignment of the groove portion 12 for forming the microchannel and the protruding portion 14. If the necessary accuracy is satisfied, a processing method by machining or etching may be used.

Figure 3:
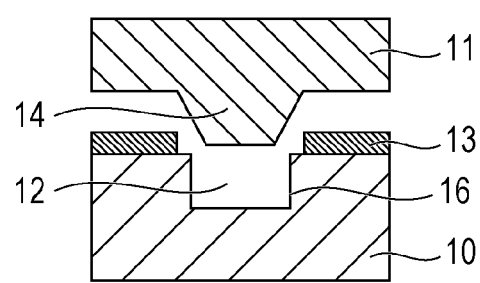
FIG. 3 is a schematic sectional view showing an example of a channel device before bonding.

FIG. 3 shows the state of the first substrate 10 and the second substrate 11 before bonding. The protruding portion 14 is disposed along the microchannel, and must have such a shape that, at the time of bonding, the protruding portion 14 is in contact with the groove portion 12 without adhesive therebetween, directly, and in a material to material manner. That is, the protruding portion 14 must have such a shape that both opposite side wall portions 15 of the protruding portion 14 are in contact with both opposite side wall portions 16 of the groove portion 12 of the first substrate without adhesive therebetween, linearly, and directly, and a channel is thereby formed. At this time, adhesive 13 is disposed outside the channel and bonds the second substrate and the first substrate. Thus, for example, the side wall portions 15 of the protruding portion 14 are tapered so that the protruding portion has a trapezoidal cross-sectional shape, and the side wall portions 16 of the groove portion 12 having a rectangular cross-sectional shape are pressed against the side wall portions 15 of the protruding portion 14. The side wall portions of the protruding portion are thereby linearly and directly in contact with the side wall portions of the groove portion. If adhesive is pressed toward the channel, the direct contact part serves as a barrier and prevents adhesive from moving into the channel.

Figure 4A:
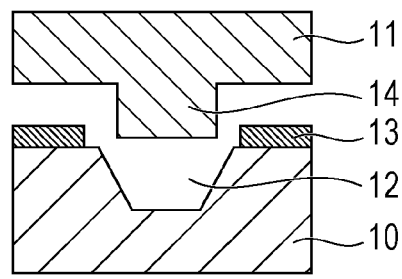
FIGS. 4A to 4C are schematic sectional views showing other examples of the channel device.
Figure 4B:
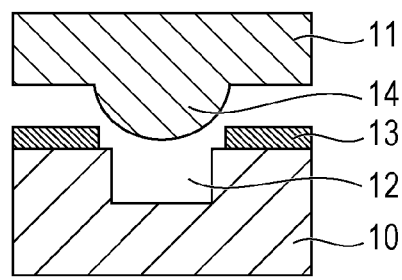
Figure 4C:
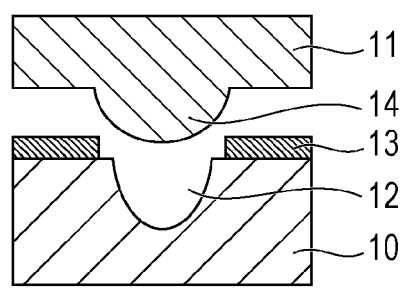

The shapes of the protruding portion and the groove portion are not particularly limited as long as the protruding portion and the groove portion can be in direct contact with each other. The relationship between the taper of the protruding portion and the upright side walls of the groove portion may be reversed (see FIG. 4A), and one or both of the side wall portions of the protruding portion and the groove portion may have a circular shape having a constant or changing curvature (see FIGS. 4B and 4C). Typical examples are shown in FIGS. 4A to 4C. In order to secure a predetermined cross-sectional shape of the microchannel, the protruding portion and the groove portion can have such shapes that the microchannel is not clogged by the protruding portion when the groove portion of the first substrate 10 and the protruding portion of the second substrate 11 are aligned with each other and a pressure is applied in the thickness direction. Specifically, the side wall portions of the protruding portion and the groove portion are tapered, and the taper angles thereof are different from each other. In the case where the side wall portions of the protruding portion and the groove portion have a circular shape having a curvature, the curvatures thereof are different from each other, and are appropriately adjusted so that a space (microchannel) is formed. As shown in FIG. 4B, the side wall portions of one of the protruding portion and the groove portion may have a circular shape, and the side wall portions of the other may be upright side wall portions or tapered inclined surfaces. Anyway, the protruding portion and the groove portion only have to have such shapes that the side wall portions of the protruding portion can be linearly and directly in contact with the side wall portions of the groove portion, and a sealed channel can thereby be formed.

The thickness of the substrates used in this embodiment is not particularly limited, but can be large enough so that the substrates are not deformed by the pressure of fluid flowing through the microchannel. For example, in the case of plastic substrates, the thickness can be 0.1 mm or more. When the thickness is 0.1 mm or less, deformation occurs owing to the pressure of fluid in the microchannel, and difficulties may be caused in the pressure control of solution. Although the upper limit of the thickness is not particularly limited, the most appropriate thickness is selected in terms of the shape of product, yield rate, manufacturing cost, and the like. Adhesive used in this embodiment is not particularly limited as long as it is suitable to the material of the substrate to be bonded. Adhesives include ultraviolet cure adhesives, such as acrylic adhesive, polyester adhesive, and urethane adhesive, and thermoset adhesive. Selecting an adhesive that is suitable to the material of the substrate to be bonded and that can provide the most appropriate bonding strength is a matter of course. In the case of plastic substrates, ultraviolet cure adhesives, particularly acrylic adhesive can be used due to its high bonding strength and short curing time.

The viscosity of adhesive used in this embodiment is not particularly limited, but can be 1 to 3000 Pa·s. If the viscosity of adhesive is lower than the lower limit, adhesive is likely to fall into the channel when applied to the substrate, and is likely to clog the channel. If the viscosity of adhesive is higher than the upper limit, the viscosity of adhesive is too high, and after application, the thickness of the adhesive layer is likely to be uneven. Although the method for applying adhesive used in this embodiment is not particularly limited, a screen printing method, flexographic printing method, offset printing method, gravure printing method, and the like can be used.

In order to prevent adhesive from falling into the channel, a pattern mask along the shape of the channel can be fabricated, and pattern printing can be performed on the substrate 10 having the groove portion of the channel. The width of the non-printing part of the pattern for printing adhesive 13 can be greater than the width of the groove portion 12 (see FIG. 3). Adhesive can be applied to the opposite substrate 11 of the channel not by pattern printing. In that case, at the time of bonding, a pressure needs to be applied until the protruding portion and the groove portion come into direct contact with each other through the adhesive. In that case, adhesive may remain in the channel. So, as needed, the channel is designed while taking into account the remained amount, or compressed air and cleaner is caused to flow through the channel to remove the remaining adhesive. A method for manufacturing a channel device made by bonding a first substrate and a second substrate with adhesive as described above includes the following steps.

That is, adhesive is applied to a predetermined part of at least one of the first substrate and the second substrate, alignment is performed such that the groove portion of the first substrate and the protruding portion of the second substrate are superimposed on each other, and the first substrate and the second substrate are bonded together. After bonding, a pressure is applied to at least one of the first substrate and the second substrate, and mutually corresponding parts of the protruding portion of the second substrate and the groove portion of the first substrate are brought into contact with each other without adhesive therebetween, linearly, and directly. Adhesive can be applied so as to be disposed in a part outside the groove portion of the first substrate and along the groove portion. More specifically, when applying adhesive to the substrate, adhesive is applied at a distance from a position where, after bonding, mutually corresponding parts of the protruding portion of the second substrate and the groove portion of the first substrate are in contact with each other without adhesive therebetween, linearly, and directly, and along the groove portion and/or the protruding portion. When the substrates are bonded together, adhesive fills up to a position where the first substrate and the second substrate are in direct contact with each other.

Example 1

More specific examples will now be described.

In Example 1, a microchannel device was manufactured by applying the configuration described in the above embodiment. Acrylic resin was prepared as a substrate material, and the substrate shape shown in FIG. 1 was obtained by molding. The substrate measured 60 mm wide (in the vertical direction of FIG. 1), 30 mm deep (in the horizontal direction of FIG. 1), and 0.8 mm thick. A first substrate 10 having a groove portion 12 (100 μm in width and 50 μm in height) to form a microchannel, and hole portions (through-holes) 20 (0.35 mm in diameter), and a second substrate 11 having a protruding portion 14 having a shape following the groove portion 12 of the first substrate were fabricated. The cross-sectional shape of the protruding portion 14 had a width of 102 μm and a height of 10 μm, and the taper angle of both opposite side wall portions was 40°.

An ultraviolet cure acrylic adhesive (5540 manufactured by Kyoritsu Chemical & Co., Ltd., acrylic resin-based) was applied to the first substrate 10 with a flexographic printer, using a printing plate (polybutadiene resin plate) patterned according to the groove portion, as shown in FIG. 3, in a thickness of about 3 μm. The patterned printing plate used had such a pattern that the distance from the lateral edge of the groove portion 12 to adhesive to be applied was 100 μm.

After the application of adhesive to the first substrate 10, alignment was performed so that the protruding portion 14 of the second substrate 11 was aligned with the groove portion 12, and then both substrates were bonded together. A rubber roller (manufactured by Audio-Technica Corporation, 30 mm in diameter, butyl rubber) was used in bonding. The rubber roller was pressed against one end of the groove portion with a pressure of about 2 kgf and was rolled to the other end to perform bonding. The evaluation results are shown in Table 1.

Example 2

In Example 2, acrylic resin was prepared as a substrate material, and the substrate shape shown in FIG. 1 was obtained by molding. The substrate measured 60 mm wide, 30 mm deep, and 0.8 mm thick. A first substrate 10 having a groove portion 12 (100 μm in width and 50 μm in height) to form a microchannel, and hole portions 20 (0.35 mm in diameter), and a second substrate 11 having a protruding portion 14 having a shape following the groove portion 12 of the first substrate were fabricated. The cross-sectional shape of the groove portion 12 had a radius of curvature of 130 μm and a diameter of 260 μm (see FIG. 4B). Under the same conditions as in Example 1, application of adhesive and bonding were performed. The evaluation results are shown in Table 1.

Example 3

Acrylic resin was prepared as a substrate material, and the substrate shape shown in FIG. 1 was obtained by molding. The substrate measured 60 mm wide, 30 mm deep, and 0.8 mm thick. A first substrate 10 having a groove portion 12 (100 μm in width and 50 μm in height) to form a microchannel, and hole portions 20 (0.35 mm in diameter), and a second substrate 11 having a protruding portion 14 having a shape following the groove portion 12 of the first substrate were fabricated. The cross-sectional shape of the groove portion 12 had a radius of curvature of 130 μm and a diameter of 260 μm (see FIG. 4B). An ultraviolet cure acrylic adhesive (5540 manufactured by Kyoritsu Chemical & Co., Ltd., acrylic resin-based) was applied to the second substrate 11 with a flexographic printer, using an entirely flat printing plate (polybutadiene resin plate) not patterned according to the protruding portion, as shown in FIG. 3, in a thickness of about 3 μm. Under the same conditions as in Example 1, bonding was performed. The evaluation results are shown in Table 1.

Comparative Example 1

Acrylic resin was prepared as a substrate material, and the substrate shape shown in FIG. 1 was obtained by molding. The substrate measured 60 mm wide, 30 mm deep, and 0.8 mm thick. A first substrate having a groove portion 12 (100 μm in width and 50 μm in height) to form a microchannel, and hole portions 20 (0.35 mm in diameter), and a second substrate having a flat plate shape were fabricated. Under the same conditions as in Example 3, adhesive was applied to the second substrate using an entirely flat printing plate and bonding was performed. The evaluation results are shown in Table 1.

Comparative Example 2

The same substrate as that of Comparative Example 1 was prepared, and an ultraviolet cure acrylic adhesive (5540 manufactured by Kyoritsu Chemical & Co., Ltd., acrylic resin-based) was applied to a flat plate-shaped second substrate with a flexographic printer, using a not patterned entirely-flat printing plate (polybutadiene resin plate), as shown in FIG. 3, in a thickness of about 1.5 μm. Under the same conditions as in Example 3, bonding was performed. The evaluation results are shown in Table 1.

TABLE 1

| Did voids formed on bonded surface interfere with function of microchannel? | |
|---|---|
| Example 1: | function was not affected |
| Example 2: | function was not affected |
| Example 3: | function was not affected |
| Comparative Example 1: | function was not affected |
| Comparative Example 2: | function was affected |
| Did adhesive flow into and clog microchannel? | |
| Example 1: | there was no clogging in channel |
| Example 2: | there was no clogging in channel |
| Example 3: | there was no clogging in channel |
| Comparative Example 1: | there was clogging in channel |
| Comparative Example 2: | there was no clogging in channel |
| Did height of microchannel change? | |
| Example 1: | there was no change |
| Example 2: | there was no change |
| Example 3: | there was no change |
| Comparative Example 1: | there was change |
| Comparative Example 2: | there was change |
| Determination of suitability as microchannel | |
| Example 1: | good |
| Example 2: | good |
| Example 3: | good |
| Comparative Example 1: | bad |
| Comparative Example 2: | bad |

Although preferred embodiments of a channel device of the present disclosure, such as a microchannel device, have been described specifically, the present disclosure is not limited to the above-described embodiments unless departing from the above-described spirit of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-199709, filed Sep. 26, 2013, which is hereby incorporated by reference herein in its entirety.

What is claimed is:

1. A channel device comprising:
a first substrate having a groove portion for forming a channel; and
a second substrate having a protruding portion that covers the groove portion, the first substrate and the second substrate being bonded together with an adhesive,
wherein the protruding portion of the second substrate extends along a direction corresponding to an extending direction of the groove portion of the first substrate,
wherein mutually corresponding parts of the protruding portion of the second substrate and the groove portion of the first substrate are in direct and linear contact with each other without an adhesive therebetween, and the channel is thereby formed, and
wherein a space of the channel and a space in which the adhesive is disposed are separated from each other by the linear contact.

2. The channel device according to claim 1, wherein both opposite side wall portions of the protruding portion of the second substrate are in direct and linear contact with both opposite side wall portions of the groove portion, respectively, of the first substrate without adhesive therebetween, and the channel is thereby formed.

3. The channel device according to claim 1, wherein the adhesive is disposed outside the channel and bonds the second substrate and the first substrate.

4. The channel device according to claim 1, wherein the channel device is configured as a microchannel device.

5. The channel device according to claim 1, wherein the channel device has a fitting structure that, in a cross-section of the channel, a height of the channel from a bottom of the groove portion of the first substrate to a top of the protruding portion of the second substrate is constant in an extending direction of the channel.

6. The channel device according to claim 1, wherein the first substrate and the second substrate both have a flat plate shape.

7. The channel device according to claim 1, wherein a combination of a cross-sectional shape of the groove portion of the first substrate and a cross-sectional shape of the protruding portion of the second substrate is a combination of a rectangular shape and a trapezoidal shape, a combination of a rectangular shape and a circular shape, or a combination of two circular shapes having different curvatures.

8. The channel device according to claim 1, wherein materials for the first substrate and the second substrate are both selected from glass, plastic, metal, and inorganic compound.

9. The channel device according to claim 1, wherein the first substrate and the second substrate are not in direct contact with each other in a portion other than the linear contact.

10. The channel device according to claim 1, wherein the adhesive is disposed such that the first substrate and the second substrate are not in direct contact with each other in a portion other than the linear contact, and such that a space between a surface of the first substrate and a surface of the second substrate is filled with the adhesive.

* * * * *